United States Patent
Kanevsky et al.

(10) Patent No.: US 6,618,704 B2
(45) Date of Patent: Sep. 9, 2003

(54) SYSTEM AND METHOD OF TELECONFERENCING WITH THE DEAF OR HEARING-IMPAIRED

(75) Inventors: Dimitri Kanevsky, Ossining, NY (US); Sara H. Basson, White Plains, NY (US); Edward Adam Epstein, Putnam Valley, NY (US); Peter G. Fairweather, Yorktown Heights, NY (US)

(73) Assignee: IBM Corporation, Armonk, NY (US)

( * ) Notice: Subject to any disclaimer, the term of this patent is extended or adjusted under 35 U.S.C. 154(b) by 0 days.

(21) Appl. No.: 09/727,878

(22) Filed: Dec. 1, 2000

(65) Prior Publication Data

US 2002/0069069 A1 Jun. 6, 2002

(51) Int. Cl.$^7$ .............................................. G10L 21/06
(52) U.S. Cl. ...................................... 704/271; 704/260
(58) Field of Search ........................ 345/758; 715/523; 704/271, 260; 709/204

(56) References Cited

U.S. PATENT DOCUMENTS

| | | | | | |
|---|---|---|---|---|---|
| 5,321,801 | A | * | 6/1994 | Ando ........................ | 715/535 |
| 5,694,163 | A | * | 12/1997 | Harrison .................... | 725/110 |
| 5,916,302 | A | * | 6/1999 | Dunn et al. ................ | 709/204 |
| 6,377,925 | B1 | * | 4/2002 | Greene et al. .............. | 704/271 |
| 6,404,746 | B1 | * | 6/2002 | Cave et al. ................. | 370/262 |
| 6,421,425 | B1 | * | 7/2002 | Bossi et al. ................. | 379/52 |
| 6,453,294 | B1 | * | 9/2002 | Dutta et al. ............. | 704/270.1 |
| 6,513,003 | B1 | * | 1/2003 | Angell et al. .............. | 704/235 |
| 6,539,354 | B1 | * | 3/2003 | Sutton et al. .............. | 704/260 |
| 2001/0033298 | A1 | * | 10/2001 | Slotznick ................... | 345/758 |
| 2002/0032037 | A1 | * | 3/2002 | Segawa ....................... | 455/517 |
| 2002/0169592 | A1 | * | 11/2002 | Aityan ......................... | 704/2 |

OTHER PUBLICATIONS

First, the mood ring . . . , Monthly, Financial Post, Monday, Sep. 18, 2000.

* cited by examiner

Primary Examiner—Marsha D. Banks-Harold
Assistant Examiner—Qi Han
(74) Attorney, Agent, or Firm—Dilworth & Barrese, LLP (57) ABSTRACT

A system and method is provided for real time teleconferencing, where one of the participants is deaf or hearing-impaired. In one aspect of the system and method, each participant has an Automatic Speech Recognition (ASR) system and a chat service system, such as AOL Instant Messenger™. Each participant may have a different type of ASR system, as well as a different type of chat service system. It is not necessary that the deaf or hearing-impaired participant have an ASR system. For each participant, the participant's ASR system transcribes the speech of the participant and provides it to the participant's chat service system, which translates the transcribed text into the chat service message in the format of the participant's chat service system. An Integration Server receives all the participant's chat messages, which have various formats, and translates them into the format used by the chat service system of the deaf or hearing-impaired participant, thus allowing her to see the transcribed text of the conversation between the other participants. In addition, the deaf or hearing-impaired participant inputs text to her chat service system, which creates a formatted message text. The Integration Server receives this formatted chat message and translates it into the formats of the remaining participant's chat service systems, so that the remaining participants see the comments of the deaf or hearing-impaired participant. In other aspects, the teleconferencing system and method is used to connect disparate chat service systems, without necessarily including a deaf or hearing-impaired participant.

13 Claims, 7 Drawing Sheets

NAME:
ACCOUNT NO:

JOB NO: 35618-J5     BILLING INFORMATION — 350

NUMBER OF PARTICIPANTS:  ○ THREE
                         ○ FOUR
                         ○ FIVE
                         ○ OTHER  □ — 317

PARTICIPANT #1: — 320
I.P. ADDRESS: — 323
TYPE OF CHAT SYSTEM: — 325
  ○ AOL INSTANT MESSENGER
  ○ MS NETMEETING
  ○ ICQ
  ○ PEOPLELINK
  ○ OTHER:   MANUFACTURER — □
             SYSTEM — □       — 325A

PARTICIPANT #2:
I.P. ADDRESS:
TYPE OF CHAT SYSTEM:
  ○ AOL INSTANT MESSENGER
  ○ MS NETMEETING
  ○ ICQ
  ○ PEOPLELINK
  ○ OTHER:   MANUFACTURER — □
             SYSTEM — □

SYSTEM AND METHOD OF TELECONFERENCING WITH THE DEAF OR HEARING-IMPAIRED

BACKGROUND OF THE INVENTION

1. Field of the Invention

This invention relates to a system and method for providing the deaf or hearing impaired to participate in a teleconference in general, and, in particular, to a system and method that provides a platform which allows various Automatic Speech Recognition (ASR) systems to communicate over various chat messenger systems so that a deaf or hearing-impaired person may receive a transcribed text of the teleconference.

2. Description of the Related Art

Presently, there are several methods for the deaf and hearing-impaired to interpret those speaking to them. One method is having a live interpreter, who listens to the conversation and translates the spoken words into sign language, and vice-versa. Another method is having a live stenographer, who listens to the conversation and types the spoken words so that they may be viewed in real-time and responded to. Yet another method is a stenographic, or Automatic Speech Recognition (ASR), program, which transcribes the spoken words in the same manner as a live transcriber.

However, teleconferencing presents particular problems to the deaf and hearing impaired. The logistics of providing one or more live interpreters or translators would be both complex and expensive. Although using a computer program, i.e. ASR, is cheaper than an interpreter/stenographer, ASR has its own problems. If the ASR program is speaker-dependent, it requires a certain amount of time to be trained to the intonations of each individual speaker. This would require multiple speaker profiles to be stored in order that the ASR program could deal with the audio input from the multiple participants in a teleconference. These profiles would use up more and more storage space. The ASR system itself would need to be more complex, because it would need to deal with several different audio streams being received simultaneously.

There is a need for a system and method that provides the ability for the deaf and hearing impaired to participate in teleconferencing without using up an inordinate amount of memory resources or an inordinate amount of computing resources for the interpretation of all the participant's audio streams. In addition, there is a need to apply current advances in network and mobile computing to interpretive services for the deaf and hearing-impaired.

SUMMARY OF THE INVENTION

An aspect of this invention is to provide a system and method for teleconferencing with the deaf and hearing impaired.

Another aspect of this invention is to provide a system and method for teleconferencing with the deaf and hearing-impaired using distributed memory resources for storing multiple ASR speaker profiles.

Yet another aspect of this invention is to provide a system and method for teleconferencing with the deaf and hearing-impaired using distributed computing resources for performing ASR on multiple audio streams.

To fulfill the above and other aspects, a system and method for teleconferencing using distributed resources is provided. In one embodiment of the system and method, a system and method is provided for real time teleconferencing, where one of the participants is deaf or hearing-impaired. In one embodiment of the system and method, the deaf or hearing-impaired has a chat service system, while the remaining participants have Automatic Speech Recognition (ASR) systems and a chat service systems, such as AOL Instant Messenger™. Each of the remaining participants may have a different type of ASR system, as well as a different type of chat service system. The speech of a participant is transcribed by an ASR system and then the transcription is provided to a chat service system, which translates the transcribed text into its own chat service message format. An Integration Server receives all the participant's chat messages, which have various formats, and translates them into the format used by the chat service system of the deaf or hearing-impaired participant, thus allowing her to see the transcribed text of the conversation between the other participants. In order to enter the conversation, the deaf or hearing-impaired participant inputs text to her chat service system, which creates a formatted message text. The Integration Server receives this formatted chat message and translates it into the formats of the remaining participant's chat service systems, thus allowing the remaining participants to see the comments of the deaf or hearing-impaired participant. In some embodiments, every participant can see the text of the input of every other participant. In other embodiments, the teleconferencing system and method is used to connect disparate chat service systems, without necessarily including a deaf or hearing-impaired participant.

BRIEF DESCRIPTION OF THE FIGURES

The foregoing and other objects, aspects and advantages will be better understood from the following detailed description of preferred embodiments of the invention with reference to the following drawings.

DETAILED DESCRIPTION OF THE PREFERRED EMBODIMENTS

In the following description, the term "server" is used in a generic functional sense. The term "server" should be understood within the client/server architectural model—the client requests a service, the server provides a service. Thus, the servers described below are not necessarily housed in different pieces of hardware. Indeed, any of the servers could be implemented using a distributed network system, where the functional elements of a server are not only distributed among nodes, but will often migrate from node to node. On the opposite end of the spectrum, the servers discussed below could be resident on one mainframe computer. However much of each server is implemented in software, firmware, or hardware is also open to many variations, as is well known in the art.

In like manner, the terms "network", "computer" and "computing device" are used in the most general sense. A "computer" or "computing device" is any computing means, from a single microprocessor or micro-controller to a computer system distributed over multiple processing nodes. A "network" includes any means that connects computers. Thus, although the preferred embodiments use the Internet and an Ethernet Local Area Network (LAN), the nodes could connect to a central server through individual point-to-point connections. The term "teleconference", although used to describe an audio teleconference in the following description, includes the real-time communication of material, including, but not limited to, audio and video, between and among two or more participants over one or more communication links. Other terms in the text are also to be understood in a generic functional sense, as would be known by one skilled in the art.

I. Teleconferencing Environments

Figure 1A:
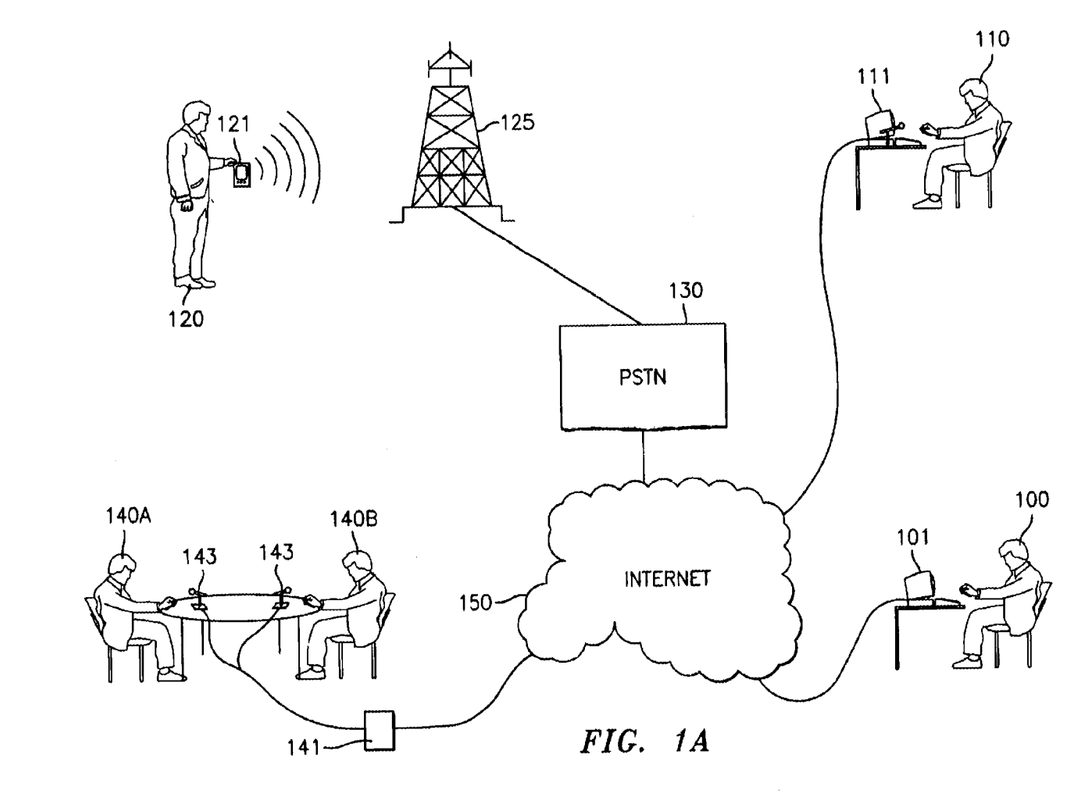
FIGS. 1A to 1B are block diagrams of various environments in which embodiments of the present invention may be employed.
Figure 1B:
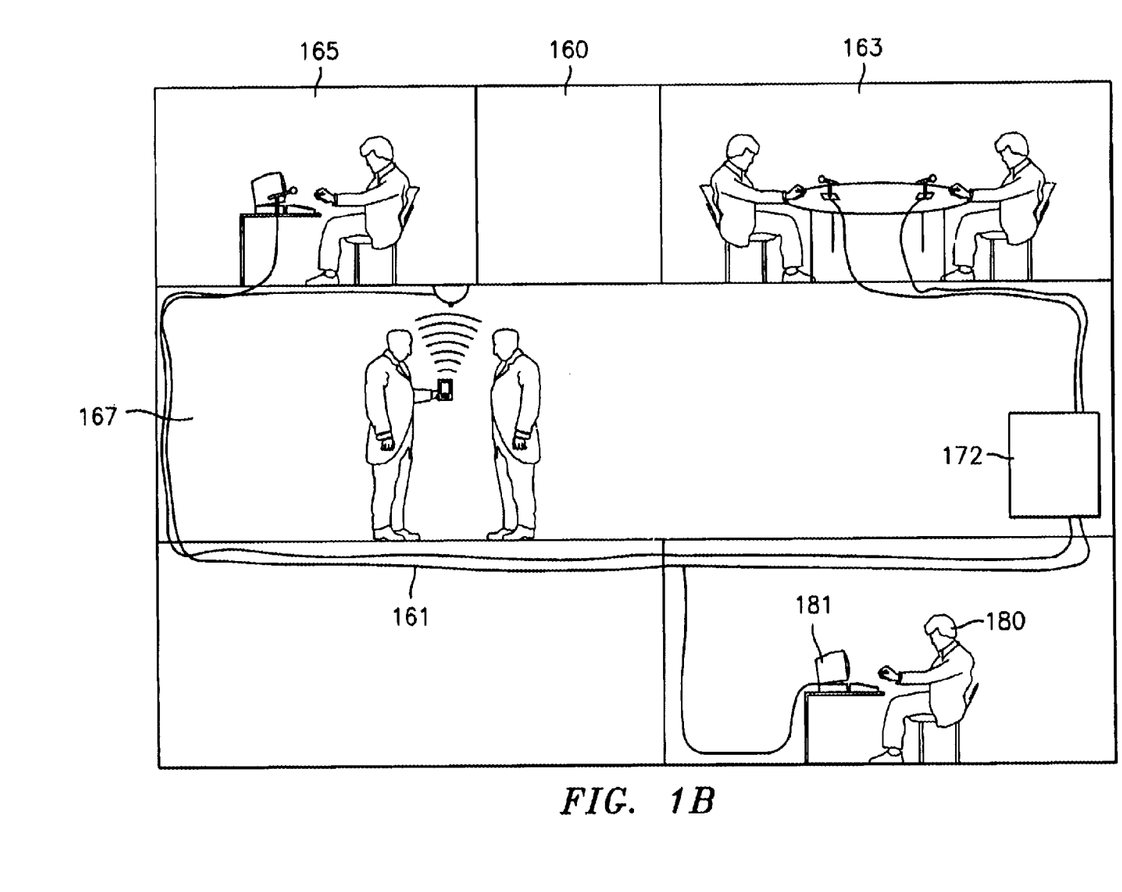

Teleconferencing may take many different forms, two of which are shown in FIGS. 1A and 1B. In FIG. 1A, a deaf or hearing-impaired user 100 uses a personal computer (PC) to participate in a teleconference with participants 110, 120, 140A, and 140B. The participants are connected through the Internet 150. Participant 110 also has a personal computer (PC) 111, with an attached microphone, and participant 110 uses PC 111 to connect, over Internet 150, with the teleconference. Participant 120 carries a Personal Digital Assistant (PDA) 121, through which the participant 120 is connected to the teleconference. PDA 121 is either connected to or integral with a cellular telephone that is in wireless communication with a base station 125. This base station 125 is, in turn, connected to a Public Switched Telephone Network (PSTN) 130. The PDA 121 connects to the teleconference through PSTN 130 and the Internet 150. Participants 140A and 140B also participate in the teleconference. Participants 140A and 140B speak into microphones 143, which are connected to computing device 141. Computing device 141 is connected to the teleconference through the Internet 150.

In this embodiment, each participant, except for the deaf or hearing-impaired user 100, has a microphone in order to participate in the teleconference. PDA 121 has a built-in microphone. In other embodiments, input/output (I/O) devices include video cameras and touchscreens. In addition, at least PC 111, PDA 121, and computing device 141 are equipped with Automatic Speech Recognition (ASR) systems. In the preferred embodiment, the ASR system creates a transcribed text from an audio input, and then a messenger service takes the transcribed text and provides it at a messenger service resident at the deaf or hearing-impaired user's PC 101. Some or all of the other participants may see the transcribed texts of the teleconference. Some or all of the other participants may hear the other participant voices broadcast from local speakers. The messenger services that are resident on each computing device (PC 101, PC 111, PDA 121, and computing device 141) maintain the teleconference. Messenger services which could be used in the preferred embodiment include AOL Instant Messenger, Microsoft NetMeeting, ICQ, PeopleLink, VP Buddy, or any messaging service operable over a network. These components will be discussed in more detail below, in the descriptions of FIGS. 2A and 2B.

Although shown connected through Internet, local, wide, or metropolitan area networks are used in other embodiments. In another embodiment, the connections are made point-to-point as telephone calls from each participant through a PSTN to a centralized server.

Another teleconferencing environment is shown in FIG. 1B, where every floor in Building 160 is wired with a Network 161. In room 165, one participant is connected via a PC equipped with a microphone. In room 163, two participants talk into microphones which are connected to computing device 172 via network 161. In hallway 167, two participants speak into a PDA equipped with a microphone. The PDA has a wireless connection to an antenna mounted on the ceiling. The ceiling antenna provides the connection with Network 161.

A deaf or hearing-impaired person 180 watches the transcribed text of the teleconference on his PC 181. Once again, one or more ASR systems are transcribing the speech of the various participants, the various texts produced by the one or more ASR systems are transmitted using one or more messenger services, and the various texts are received at the messenger service resident on PC 180 so that the deaf or hearing-impaired person 180 may participate in the teleconference.

Two different teleconference environments have been shown here, but many more are possible, as is well known in the art. Furthermore, elements in each environment shown here may be combined, replaced, separated, or interchanged. For example, building 160 in FIG. 1B could be connected to the Internet 130 in order that more widely dispersed people may participate in the teleconference. Although a PC is used in these environments in order to show the transcribed words to the deaf or hearing-impaired person, any screen device connected to a messenger service could be used.

In the preferred embodiment, the deaf or hearing-impaired person participates in the teleconference by typing in responses or comments, which are then displayed for the other participants via their individual messenger services. In other embodiments, a text-to-speech synthesizer is used to produce audio output from the deaf or hearing-impaired person's typed input.

II. Teleconferencing Modules

Figure 2A:
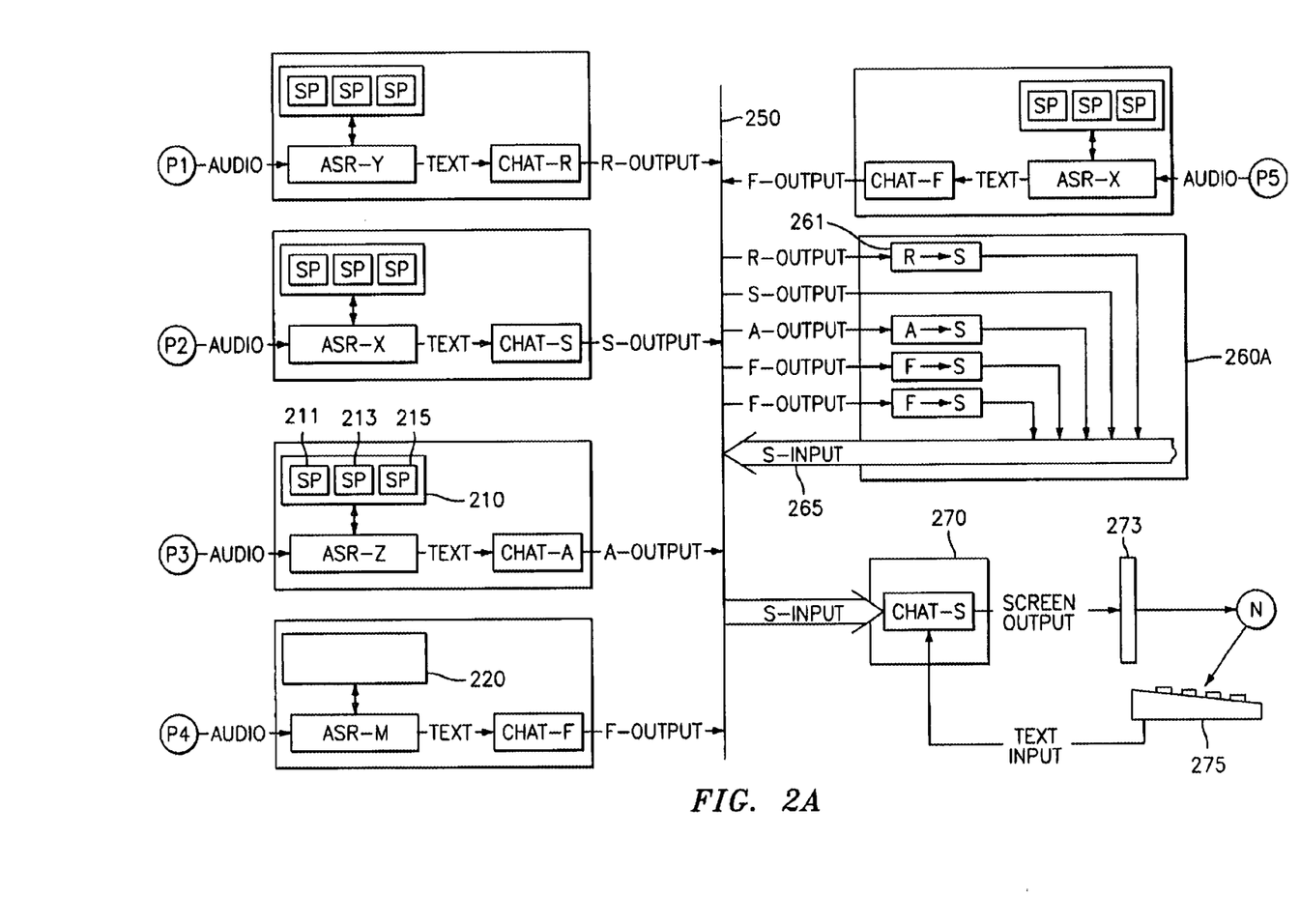
FIGS. 2A, 2B, and 2C are block diagrams of the various embodiments of the computing modules in the present invention.
Figure 2B:
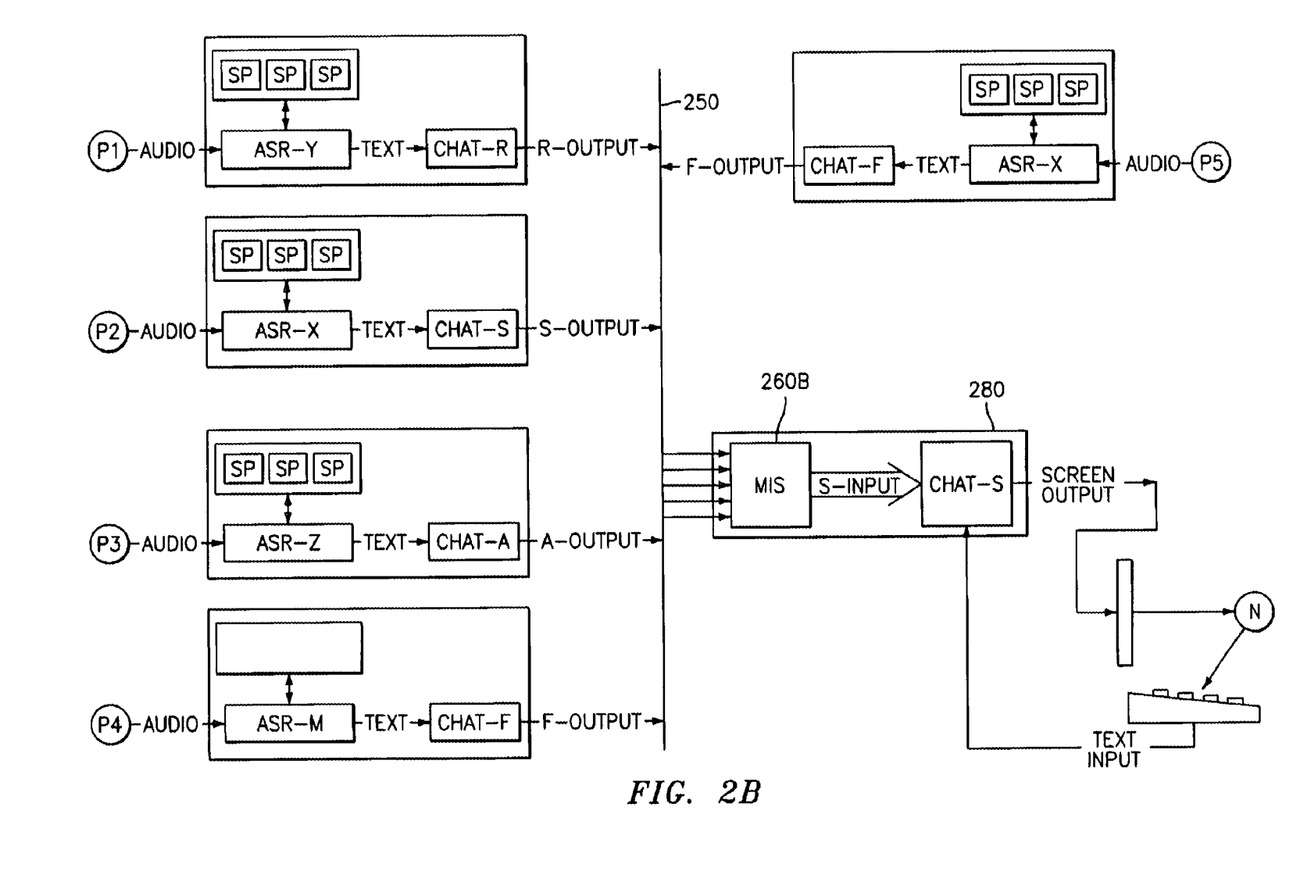
Figure 2C:
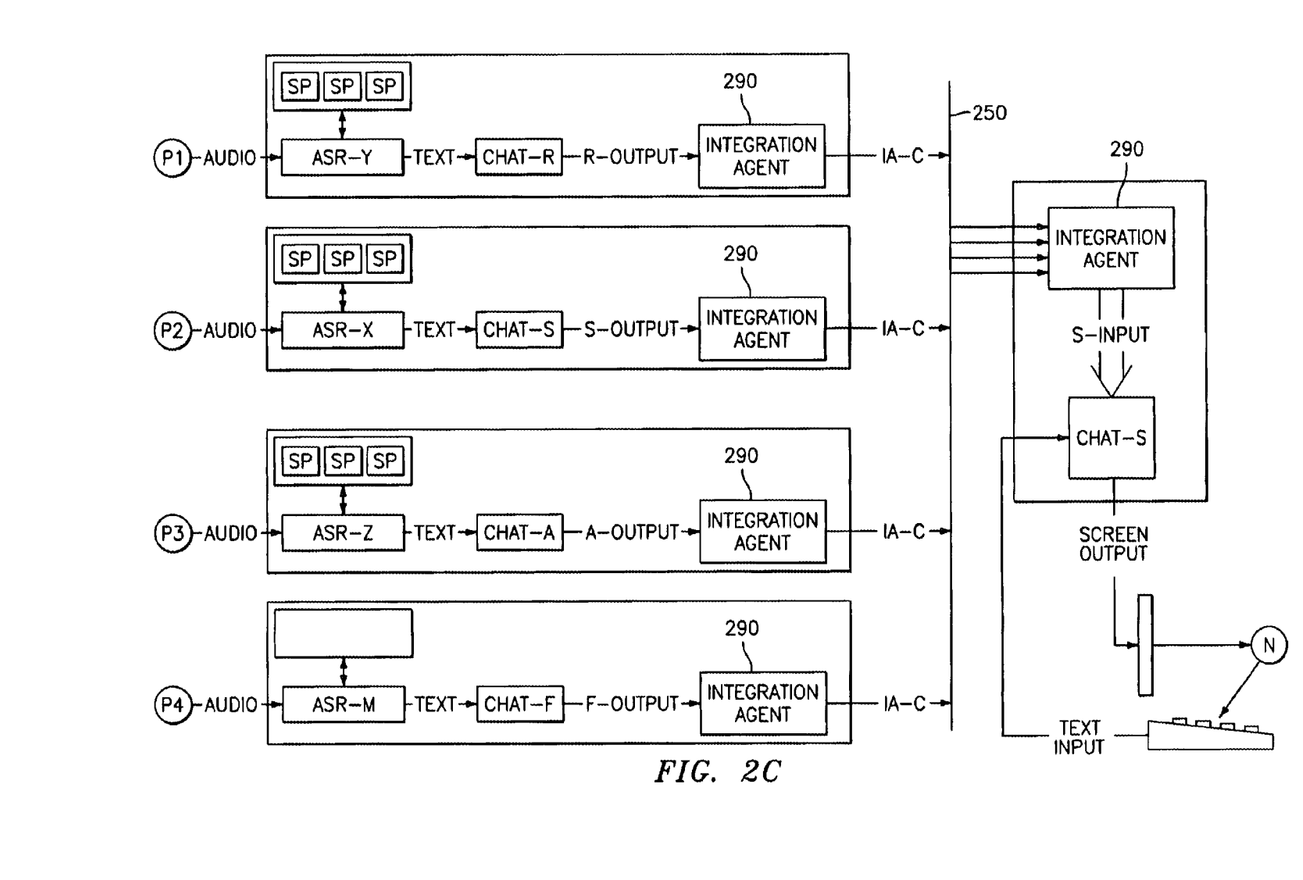

FIGS. 2A through 2C are schematic diagrams of the active modules performing the teleconferencing according to the preferred embodiments of the present invention. In FIG. 2A, the various participants are indicated by "P#", while the deaf or hearing-impaired person is indicated by "N". Although only one deaf or hearing-impaired person is shown, it is obvious that the teleconference may consist of a majority of deaf or hearing-impaired participants, rather than a minority. Each participant P has an ASR system that is transcribing the participant's audio input into text. For instance, participant P2 is using ASR system ASR-X to transcribe participant P2's audio input. Although participant P5 is using the same ASR system ASR-X, the other participants are using different ASR systems, including systems ASR-Y, ASR-Z, and ASR-M. These systems may be implemented by any combination of software, hardware, and firmware, as is well-known in the art. For instance, ASR-M might be implemented as a ASIC chip, while ASR-Z may be an off-the-shelf ASR program installed and running on a PC.

Furthermore, each ASR system maintains its own locally stored speaker profiles. For example, participant P3's speaker profile 211 is stored in a memory 210 connected to ASR-Z. Memory 210 also contains other speaker profiles, as indicated by 213 and 215. These speaker profiles are used in speaker-dependent ASR. Participant P4 is using a speaker-independent ASR system, whose memory 220 stores no speaker profiles, although it does store a dictionary/vocabulary of sounds in order to correctly recognize inputted speech.

Each ASR system provides its text output to a messenger system, such as CHAT-Q. Like the various ASR systems, the different participants are also using various messenger systems, including CHAT-R, CHAT-S, CHAT-A, and CHAT- F. For example, participant P1's ASR text output is received by messenger service CHAT-R, which outputs R-OUTPUT appropriate to the CHAT-R system. These messenger systems may be implemented by any combination of software, hardware, and firmware, as is well-known in the art. For instance, CHAT-A might be implemented as AOL Instant Messenger, while CHAT-R may be an ASR system implemented in hardware. All of the various outputs go into Network 250.

Preferably, each ASR system includes a buffer (not shown) for storing the text output prior to transmitting portions of the text output at a predetermined rate to a respective messenger system to prevent an overflow at a receiving server, such as MIS 260A, of the Network 250. An overflow may occur where the ratio with which words are generated by the ASR system is higher than the receiving server allows. Accordingly, it is preferable to store the text output in the buffer and transmit portions of the text output to the messenger system at the predetermined rate, before transmitting the portions of the text output to the receiving server. The predetermined rate is determined according to how many words per minute the receiving server is programmed to receive.

All of the CHAT outputs are received at Master Integration Server (MIS) 260. In FIG. 2A, MIS 260A translates and aligns all of the CHAT outputs into an input stream that deaf or hearing-impaired person N's CHAT system will understand. The R-OUTPUT from participant P1's CHAT system is received at MIS 260A, and translated by module 261 into S-INPUT. This is because the CHAT system of deaf or hearing-impaired participant N is CHAT-S, so the output of the other participants will need to be understood by the CHAT-S system. The S-OUTPUT does not need to be translated. MIS 260A also translates the time alignment of each CHAT system into the time alignment of participant N's CHAT system, so that the order of comments in the teleconference is maintained. The translated OUTPUTs become the S-INPUT stream 265 which is transmitted back to Network 250.

The CHAT-S system 270 of deaf or hearing-impaired participant N receives the S-INPUT stream 265 from Network 250 and treats it like any input into a messenger system. This is one of the advantages of the present invention: the CHAT systems do not need to be altered or changed in any way, because MIS 260A makes the differences between systems transparent. S-INPUT stream 265 appears in the appropriate CHAT-S format on Screen 273 for participant N to view. Participant N may also enter the teleconference by typing in text at keyboard 275, which is sent out by CHAT-S system 270 as S-OUTPUT. Although not shown in FIG. 2A, MIS 260A performs the reciprocal operation on the N participant's S-OUTPUT, namely, translating and time-aligning it appropriately for all the other participants CHAT systems. An audio cue, such as a beep, may be produced at the other participant's systems, in order that the other participants know to look at participant N's input to the teleconference.

In the preferred embodiments, the CHAT systems of all the participants are performing input and output. In other words, all participants can view a running transcription of the teleconference on a local screen. Because participant N does not participate aurally, participant N's text is highlighted on all the participants' screens.

As mentioned above, a server, such as MIS 260A, may take a myriad of forms and be implemented in any combination of software, hardware, and firmware. In FIG. 2B, MIS 260B is integral with the computing device 280 local to deaf or hearing-impaired participant N. The Master Integration Server 260 will need a local memory to store modules for translating from one CHAT system to another. In the embodiment of FIG. 2A, MIS 260A will need to have modules covering all permutations of input and output. Although this would use up memory resources, it would allow for great flexibility for participant N. This is because FIG. 2A's embodiment would allow deaf or hearing-impaired participant N to use any computing device with any CHAT system installed in order to join a teleconference, as long as all participants have some kind of communication link with MIS 260A. Thus, if MIS 260A of FIG. 2A is on the Internet 150, participant N would be able to roam widely.

The MIS 260B in FIG. 2B would not necessarily need the memory resources as the one in FIG. 2A, but it would only work on computing device 280. In other words, MIS 260B only needs to store the modules which can translate any CHAT OUTPUT into S-INPUT, and translate S-OUTPUT into any CHAT INPUT. This is unlike MIS 260A, which stores a module for every permutation of input and output. However, MIS 260B only works with CHAT-S and is installed in local computing device 280, thus preventing the wide roaming capabilities of MIS 260A.

In FIG. 2C, the functionality of MIS 260 is distributed throughout the network. This is done by means of an Integration Agent 290, which is installed at each of the local computing devices performing the teleconferencing. The Integration Agent works very much like the Java Virtual Machine. A Java Virtual Machine (JVM) can receive any Java bytecode from any source and run it locally, without having to re-compile it for the local operating system. This is because the JVM is compiled to work with the local operating system. So, although individual JVMs may be compiled completely differently, all JVMs can receive the exact same Java bytecode and perform the same operations.

Similarly, the Integration Agent works with the local CHAT system, and translates output from the local CHAT system into a communication medium that can be understood (or at least produced) by all Integration Agents. More specifically, as shown in FIG. 2C, the Integration Agent 290 resident in a particular system is configured to take the particular output of the local CHAT system, whether R-OUTPUT, S-OUTPUT, A-OUTPUT, or F-OUTPUT, and translates it into Integration Agent Communication (IA-C) format. The Integration Agents 290 can are bi-directional, so that they can receive IA-C data and translate that data into whatever the local CHAT input is, whether R-INPUT, S-INPUT, A-INPUT, or F-INPUT. That the appropriate Integration Agents are installed with the appropriate CHAt systems would be relatively easy. For example, the user of a CHAT-R system could go to the website of the maker of the CHAT-R system, and download an Integration Agent for the CHAT-R system. Or the CHAT-R system might come with an Integration Agent preinstalled.

These three figures show some of the important advantages of the preferred embodiments of the present invention. First, it allows for the usage of a wide variety of ASR systems. Because it is the messenger service that is providing the interface between participants, all that the ASR systems must do is produce text, which they do anyway. Second, it allows for usage of a wide variety of messenger services. Because the output of the various messenger services is translated (by MIS 260 or Integration Agent 290) into the input format of the deaf or hearing-impaired person's messenger service, practically any type of messenger service could be used by the individual participants. Third, because local ASR systems are used, there need not be a centralized location to store a voluminous collection of speaker profiles. In other words, because the profiles of the speakers that use the local computing device (such as profiles 211, 213, and 215 in P3's device in FIG. 2A) can be stored locally, the speaker profiles are, in essence, distributed to the nodes where they are used. No extra memory storage infrastructure is necessary when using embodiments of the present invention. Fourth, it uses already existing components to implement much of the structure, i.e., ASR systems, messenger systems, etc., making it cheaper and easier to build.

III. A Teleconferencing Business Model

The centralized MIS 260A of FIG. 2A could be used as a business for providing teleconferencing with the deaf and hearing-impaired. When a teleconference that includes at least one deaf or hearing-impaired person is required, the initiator of the teleconference could go to a website, maintained on the business's web server. In this embodiment, the initiator uses a web browser program, such as Netscape Navigator™, on a PC, such as 111 in FIG. 1A, to initiate a teleconference, as well as to access and post information, at the business providing teleconferencing for the deaf or hearing-impaired. When initiating a teleconference, the initiator would click on a "Teleconference?" button or a "Service Required?" button on the opening Web page. In this context, the terms "click" and "double-click" signify a user pressing the button on a mouse attached to a computer. After clicking the button, a pop-up window, which has fields to enter a login name and password, as well as "New client?" button, appears. When the "New client?" button is pressed, the potential customer is prompted to enter registration information, including billing and contact information. This registration information is used to create a billing record for that customer. In addition, a login name and password is selected for the new customer.

Because this information is being transferred to the Web Servers over the Internet (or any network), a program layer operable in the browser and web server is used to encrypt and decrypt the information. In the web browser embodiments discussed here, SSL (Secure Socket Layer), which uses a public and private key encryption system, is used to pass sensitive data between user terminals and the transcription service center.

Figure 3:
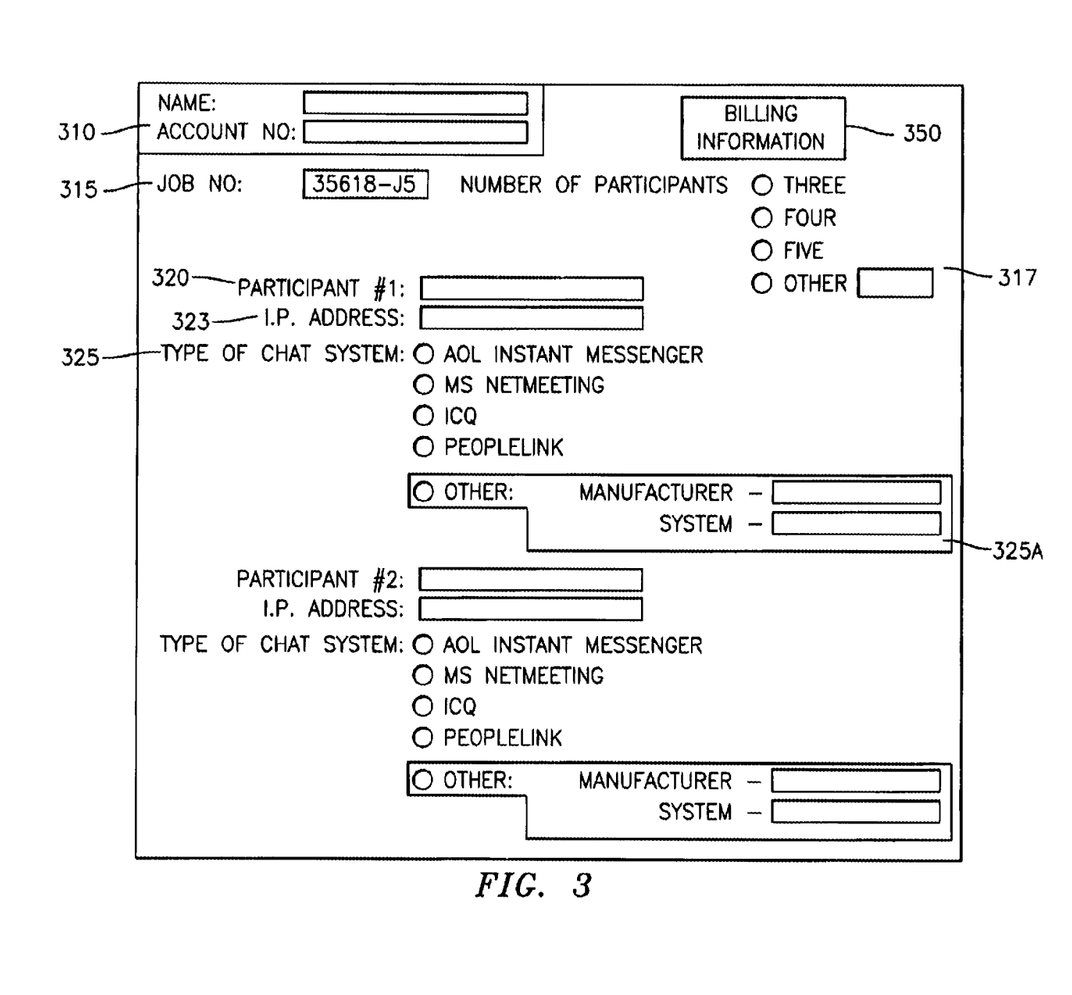
FIG. 3 is an exemplary Teleconference Set-Up web page according to an embodiment of the present invention.

Having either entered a login name and password at the pop-up window or registered as a new customer, the initiator is presented with a menu of choices, including the option to initiate a teleconference. When the initiator chooses to initiate a teleconference, a Teleconference Set-Up web page appears. An exemplary Teleconference Set-Up Web page is shown in FIG. 3. In the exemplary Teleconference Set-Up web page of FIG. 3, the name of the initiator (who is presumably paying for the service) and the initiator's account number appear in the upper left-hand corner, as indicated by reference number 310. The job number, which, in this embodiment, is automatically generated, for this particular teleconference is at 315. The initiator enters the number of participants in the teleconference at 317. Below this, the initiator enters information concerning each participant. Because the initiator may not be participating in the teleconference, each participant's information needs to be entered. At 320, the name of the first participant is entered, while the IP (Internet Protocol) address is entered at 323. The type of CHAT system the first participant is using is entered at 325. The names of popular CHAT systems have radio buttons, but the initiator may enter an unlisted CHAT system at 325A. Below this, the same information for the second participant is listed. The page may scroll down to enter additional participants based on the number entered at 317.

After all of this information is entered, the teleconference may begin. In other embodiments, the teleconference can be scheduled for a later date and time. Each participant's IP address is pinged to make sure they are online. If each participant's computing device is online, a message is sent to each participant indicating that the teleconference is about to begin. At this point, each participant's CHAT system is checked in order to make sure they fit the characteristics entered in the Set-Up web page. Then, once the available resources and communication conditions are ascertained, the estimated cost per minute of the teleconference is calculated and displayed to the appropriate party or parties. If the estimated cost is acceptable, the teleconference proceeds. In other embodiments, these steps may occur in a different order.

Figure 4:
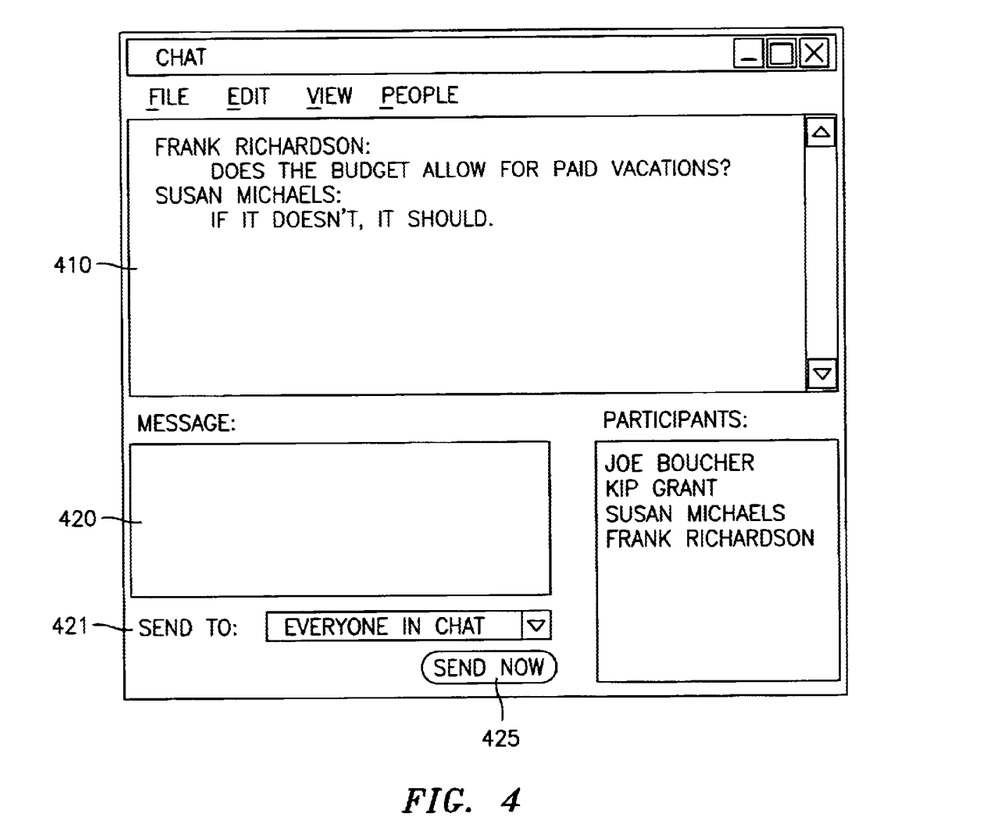
FIG. 4 is an exemplary Teleconference Window according to an embodiment of the present invention.

An exemplary Teleconferencing Window according to an embodiment of the present invention is shown in FIG. 4. This is the window used by the deaf or hearing-impaired participant N. It is a standard CHAT window, with a windowpane 410 showing the transcribed conversation of participants, a windowpane 420 for sending a message, and a windowpane 430 showing a list of participants. In addition, participant N can choose the recipients of the message at 421, and send the message by pressing button 425. For all appearances, this looks like a standard CHAT window. Even though the transcriptions are being performed by one or more independent ASR systems and the transcribed text is being sent by one or more different CHAT systems, the deaf or hearing-impaired participant has a simple and well-known means to participate in the teleconference.

It is contemplated that each ASR system is programmed to enter a new line each time the delay between two words exceeds a predetermined threshold. It is also contemplated for the ASR system to be programmed to add punctuation marks, such as the question mark in windowpane 410, based on a participant's intonation.

Further, it is also contemplated to indicate the participant's mood, such as happy, angry, confused, etc., on windowpane 410 by incorporating sensors into the system of the present invention that sense the emotional state of the participant. As a specific example, a computer mouse can be incorporated that is equipped with sensors that measure a user's pulse, temperature, movement and skin resistance to determine the emotional state of the user. An example of such a computer mouse is disclosed in Financial Post, Sep. 18, 2000.

Although the embodiment discussed above uses a web server, any network server system that provides individual files that can be accessed by different authorized groups could be used. The term "web server" is to be understood as a World Wide Web-type server that delivers web pages to clients. The web pages are in HTML (Hypertext Mark-up Language), but could be in any mark-up language decipherable by the browsers being used on the network. In this embodiment, data is retrieved from and posted to other servers using CGI (Common Gateway Interface). Furthermore, even though the connections in this embodiment are maintained over the Internet, each participant could make a direct point-to-point connection to MIS 260 in other embodiments.

As is made clear from the above description, this teleconferencing business could be used to connect any group of disparate CHAT systems, even if a deaf or hearing-impaired person was not involved.

While the present invention has been described with respect to certain preferred embodiments, it should be understood that the invention is not limited to these particular embodiments, but, on the contrary, the invention is intended to cover all modifications, equivalents, and alternatives falling within the spirit and scope of the invention as defined by the appended claims.

What is claimed is:

1. A computer-based method of teleconferencing between at least two participants, where at least one of the participants is deaf or hearing-impaired, the method comprising the steps of:

transcribing, using an Automatic Speech Recognition (ASR) system, speech of one of the participants, to produce transcribed text;

translating transcribed text into a chat transmission format using a first chat service system, said translation resulting in a first chat format text;

translating said first chat format text to a second chat format text; and receiving said second chat format text at a second chat service system, said second chat service system being used by a deaf or hearing-impaired participant;

whereby the deaf or hearing-impaired participant may read the transcribed text of the speech of other participants.

2. The computer-based method as recited in claim 1, further comprising the steps of:

transmitting said second chat format text from the second chat service system, said transmitted second chat format text being input by the deaf or hearing-impaired participant into the second chat service system;

translating the transmitted second chat format text to a first chat format text; and receiving the translated first chat format text at the first chat service system;

whereby a participant, using the first chat service system, may read the input text of the deaf or hearing-impaired participant.

3. The computer-based method as recited in claim 2, further comprising the step of:

synthesizing a human voice to speak the received first chat format text aloud so that a participant may hear it.

4. The computer-based method as recited in claim 1, wherein each participant, except for the at least one deaf or hearing-impaired participant, has an ASR system and a chat service system for performing the transcribing speech step and the translating transcribed text step, respectively.

5. A system for teleconferencing between at least two participants, where at least one of the participants is deaf or hearing-impaired, the system comprising:

at least one Automatic Speech Recognition (ASR) system for transcribing speech of at least one of the participants in order to produce transcribed text;

at least one first chat service system for receiving transcribed text and translating the received transcribed text into a chat transmission format, thus producing a first chat format text;

at least one means for translating the first chat format text to a second chat format text; and at least one second chat service system, which is being used by a deaf or hearing-impaired participant, for receiving second chat format text;

whereby the deaf or hearing-impaired participant may read the transcribed text of the speech of other participants.

6. The system as recited in claim 5, further comprising:

means for transmitting a second chat format text from the second chat service system, said transmitted second chat format text being input by the deaf or hearing-impaired participant into the second chat service system; and means for translating the transmitted second chat format text to a first chat format text;

whereby a participant, using the first chat service system, may read the input text of the deaf or hearing-impaired participant.

7. The system as recited in claim 6, further comprising:

a text-to-speech synthesizer for synthesizing a human voice to speak the translated first chat format text aloud so that a participant may hear it.

8. The system as recited in claim 5, wherein, for each participant, except for the at least one deaf or hearing-impaired participant, the system further comprises:

an Automatic Speech Recognition (ASR) system for transcribing speech of the participant in order to produce transcribed text; and a participant chat service system for receiving transcribed text and translating the received transcribed text into a chat transmission format, thus producing participant chat format text.

9. The system as recited in claim 8, the system further comprising:

at least one means for translating any participant chat format text to a second chat format text.

10. A computer system for teleconferencing between at least two participants, where at least one of the participants is deaf or hearing-impaired, the computer system comprising:

at least one computer-readable memory including:

code that performs Automatic Speech Recognition of speech of at least one of the participants in order to produce transcribed text;

code that performs a first chat service for receiving transcribed text and translating the received transcribed text into a chat transmission format, thus producing a first chat format text;

code that translates the first chat format text to a second chat format text; and code that performs a second chat service for receiving the second chat format text;

whereby the deaf or hearing-impaired participant, using the second chat service, may read the transcribed text of the speech of other participants.

11. The computer system as recited in claim 10, wherein the at least one computer-readable memory further comprises:

code that enables transmission of a second chat format text from the second chat service, said transmitted second chat format text being input by the deaf or hearing-impaired participant into the second chat service; and code that translates the transmitted second chat format text to a first chat format text;

whereby a participant, using the first chat service system, may read the input text of the deaf or hearing-impaired participant.

12. The computer system as recited in claim 11, wherein the at least one computer-readable memory further comprises:

code that performs text-to-speech synthesis in order that a synthesized human voice speaks the received first chat format text aloud so that a participant may hear it.

13. A method of providing teleconferencing comprising the steps of:

receiving a request for teleconferencing ASR training service, said request including information concerning participants in the requested teleconference;

maintaining a communication link with at least two chat service systems, where each of the participants has access to one of the chat service systems;

generating a price for performing the requested teleconference;

receiving all chat service system text messages from the chat service systems;

translating each of the chat service system text messages into chat formats used by the chat service systems; and transmitting each of the translated chat service system text messages to the chat service systems;

wherein each of the chat service systems receives every chat service system text message generated by all other chat service systems and every received chat service system text message is in a format compatible with the respective chat service systems.

* * * * *